US012731005B2

(12) United States Patent
Chen et al.

(10) Patent No.: US 12,731,005 B2
(45) Date of Patent: Sep. 8, 2026

(54) PROCESSING LABELED DATA IN A MACHINE LEARNING OPERATION

(71) Applicant: Cylance Inc., Plano, CA (US)

(72) Inventors: Tian Chen, Irvine, CA (US); John Brock, Irvine, CA (US); Daniel Lidral-Porter, Seattle, WA (US)

(73) Assignee: CYLANCE INC., Plano, TX (US)

( * ) Notice: Subject to any disclaimer, the term of this patent is extended or adjusted under 35 U.S.C. 154(b) by 547 days.

(21) Appl. No.: 18/330,473

(22) Filed: Jun. 7, 2023

(65) Prior Publication Data

US 2024/0412037 A1 Dec. 12, 2024

(51) Int. Cl.
*G06N 3/045* (2023.01)
*G06N 3/082* (2023.01)

(52) U.S. Cl.
CPC ............ *G06N 3/045* (2023.01); *G06N 3/082* (2013.01)

(58) Field of Classification Search
None
See application file for complete search history.

(56) References Cited

U.S. PATENT DOCUMENTS

2017/0185667 A1* 6/2017 Singh .................. H04L 63/1408
2023/0023164 A1 1/2023 Parameswaran et al.

FOREIGN PATENT DOCUMENTS

CN 111814883 10/2020
CN 112084836 12/2020
CN 114648683 6/2022

OTHER PUBLICATIONS

Yildirim, M.Y. et al., "Leveraging uncertainty in deep learning for selective classification," downloaded from <arxiv.org//abs/1905.09509> (May 23, 2019) 10 pp. (Year: 2019).*

Li, D. et al., "Improved regularization and robustness for fine-tuning in neural networks," Advances in Neural Information Processing Systems 34 (2021) 14 pp. (Year: 2021).*

Gal, Y. et al., "Dropout as Bayesian approximation: representing model uncertainty in deep learning," Proc. of the 33rd Intl. Conf. on Machine Learning (2016) 10 pp. (Year: 2016).*

Smith, L. et al., "Understanding measures of uncertainty for adversarial example detection," downloaded from <arxiv.org/abs/1803.08533> (Mar. 22, 2018) 10 pp. (Year: 2018).*

(Continued)

*Primary Examiner* — Brian M Smith
(74) *Attorney, Agent, or Firm* — Fish & Richardson P.C.

(57) ABSTRACT

Systems, methods, and software can be used to determine whether to re-label a labeled data. In some aspects, a method includes: obtaining, by an electronic device, a set of labeled data, wherein each of the labeled data comprises a feature vector and a label; for each labeled data in the set of the labeled data: processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score; and determining, whether to re-label one or more labeled data in the set of labeled data based on the label uncertainty scores.

17 Claims, 3 Drawing Sheets

(56) References Cited

OTHER PUBLICATIONS

Kohler, J. et al., "Uncertainty based detection and relabeling of noisy image labels" downloaded from <arxiv.org/abs/1906.11876> (May 29, 2019) 5 pp. (Year: 2019).*
Office Action in Chinese Appln. No. 202410722005.9, mailed on Dec. 26, 2025, 13 pages (with English translation).
Bernhardt et al., "Active label cleaning for improved dataset quality under resource constraints" CoRR, Submitted on Feb. 2022, arXiv:2109.00574v2, 16 pages.
Extended European Search Report in European Appln. No. 24178660.7, mailed on Oct. 31, 2024, 12 pages.
Rebbapragada et al., "Active Label Correction" 2012 IEEE 12th International Conference on Data Mining. IEEE, Dec. 10, 2012, 1080-1085.
Stokes et al., "Asking for a Section Opinion: Re-Querying of Noisy Multi-Class Labels" 2016 IEEE International Conference on Acoustics, Speech and Signal Processing (ICASSP). IEEE, Mar. 20, 2016, 2329-2333.
Zhang et al., "Malicious Codes Detection Based on Ensemble Learning" Autonomic and Trusted Computing: 4th International Conference, ATC 2007, Hong Kong, China, Jul. 11-13, 2007, Proceedings 4, Springer Berlin Heidelberg, 2007, 468-477.
Gal et al., "Deep Bayesian Active Learning with Image Data" CoRR, Submitted on Mar. 2017, arXiv:1703.02910v1, 10 pages.
Ustimenko et al., "Uncertainty in Gradient Boosting via Ensembles" CoRR, Submitted on Jun. 2020, arXiv:2006.10562v1, 13 pages.

* cited by examiner

PROCESSING LABELED DATA IN A MACHINE LEARNING OPERATION

TECHNICAL FIELD

The present disclosure relates to processing labeled data in a machine learning operation.

BACKGROUND

In some implementations, machine learning is used to classify input data. For example, a machine learning model can be used in malware detection to classify whether a software code may contain malware code and thus, incur security risk. The machine learning operation can also be used in imaging processing to classify the content of the image, or voice recognition to classify text of the audio data. The machine learning model can be used in other applications.

DESCRIPTION OF DRAWINGS

Like reference numbers and designations in the various drawings indicate like elements.

DETAILED DESCRIPTION

In some implementations, machine learning models are trained by using labeled data. The labeled data include labels that indicate a predetermined classification result. During the training process, the machine learning model processes the labeled data to tune the parameters of the machine learning model.

Therefore, a high-quality training dataset is important to developing machine learning models with high level performance. On the other hand, inaccurately labeled data can lead to biased models, causing inaccurate predictions and negative impacts on products and user experiences.

There are two sources of uncertainty in machine learning predictions: data uncertainty and knowledge uncertainty. Data uncertainty (sometimes also called aleatoric uncertainty) refers to the uncertainty or variability in the data itself. It can arise due to factors such as measurement error, missing values, or outliers. On the other hand, knowledge uncertainty (also referred to as epistemic uncertainty) arises when the model lacks understanding or knowledge about the input data. Data uncertainty is inherent in the data and usually cannot be reduced by collecting more data, while knowledge uncertainty can be reduced by providing more training data to the model.

Active learning techniques can be used to separate these two sources of uncertainty and utilize knowledge uncertainty to prioritize unlabeled data. Labeling these prioritized data will provide the model with the most useful information, which will help it make more accurate predictions. However, data uncertainty has been underutilized and largely unexplored.

One major cause of data uncertainty are label noises. Thus one way to leverage data uncertainty is by using the data uncertainty to detect mislabeled data and improve the quality of machine learning training data. In some cases, Query by-committee (QBC) can be used to quantify knowledge uncertainty in active learning. QBC involves training multiple models, or committee members, on a labeled training set. When the committee members disagree on the classification of a data point, it indicates high knowledge uncertainty.

In some implementations, QBC can also be used to estimate data uncertainty by taking into account both the degree of disagreement and the confidence of the classification. For example, in the context of binary classification, machine learning models often output probabilities ranging from 0 to 1 to represent their confidence in assigning data points to the positive class. In some cases, a probability of 0 signifies high confidence in the negative class, while a probability of 1 represents high confidence in the positive class. When a model or a committee member outputs a probability of 0.5, such a probability value would indicate uncertainty or a lack of confidence in classifying the data point to either positive or negative class.

Figure 1:
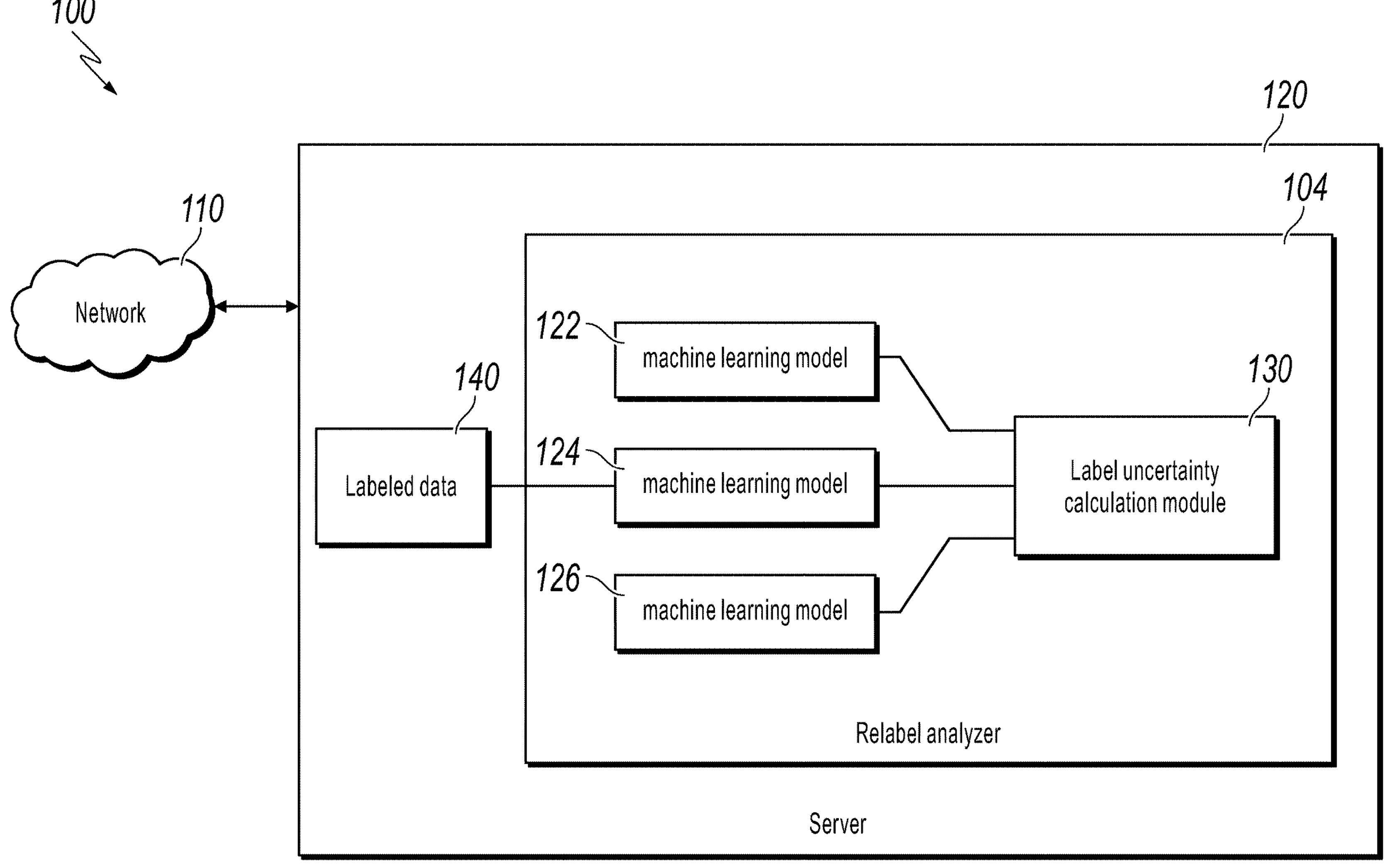
FIG. 1 is a schematic diagram showing an example system that performs a re-labeling determination operation, according to an implementation.
Figure 2:
FIG. 2 is a flow diagram showing an example process of processing labeled data, according to an implementation.
Figure 2:
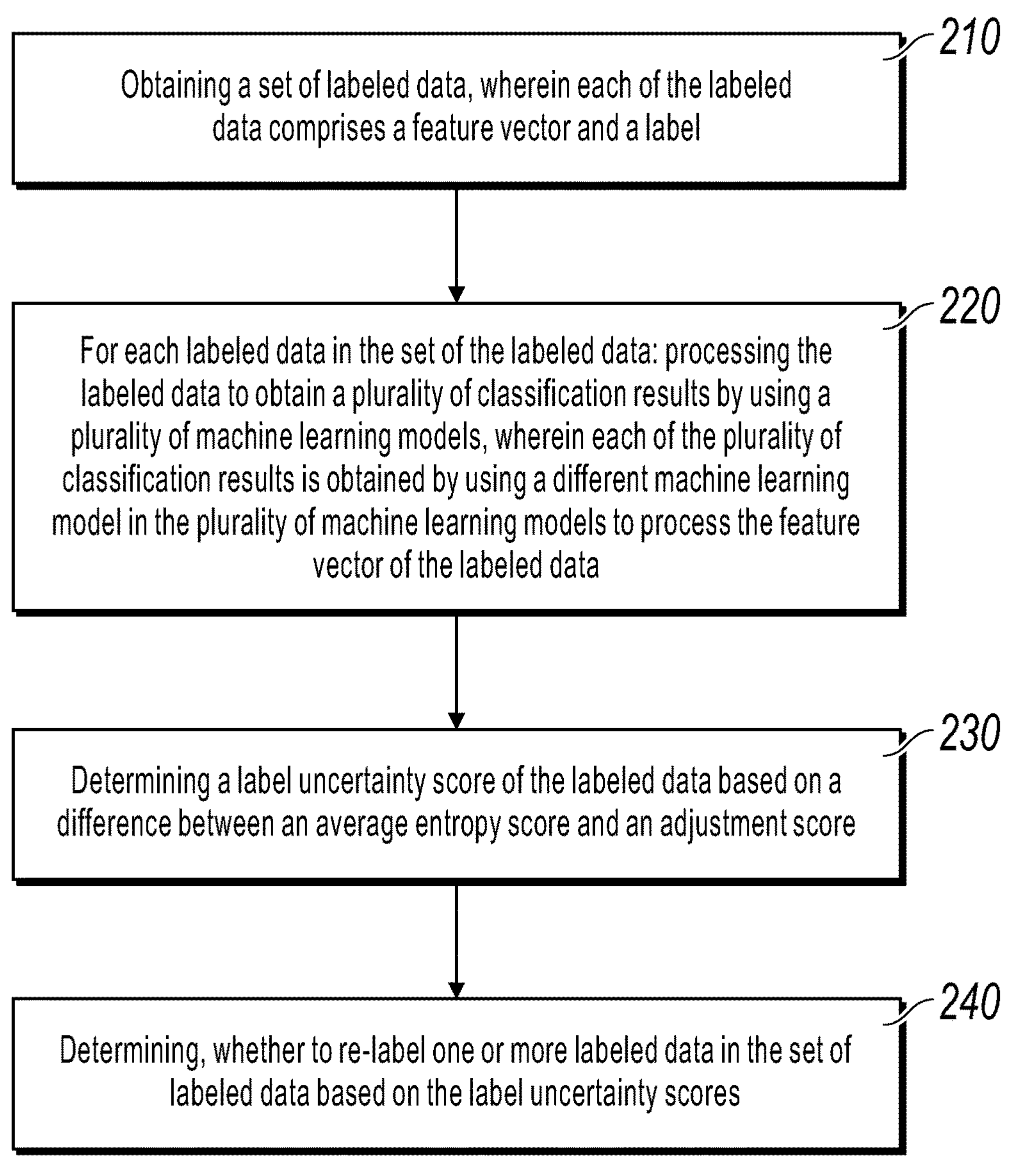
Figure 3:
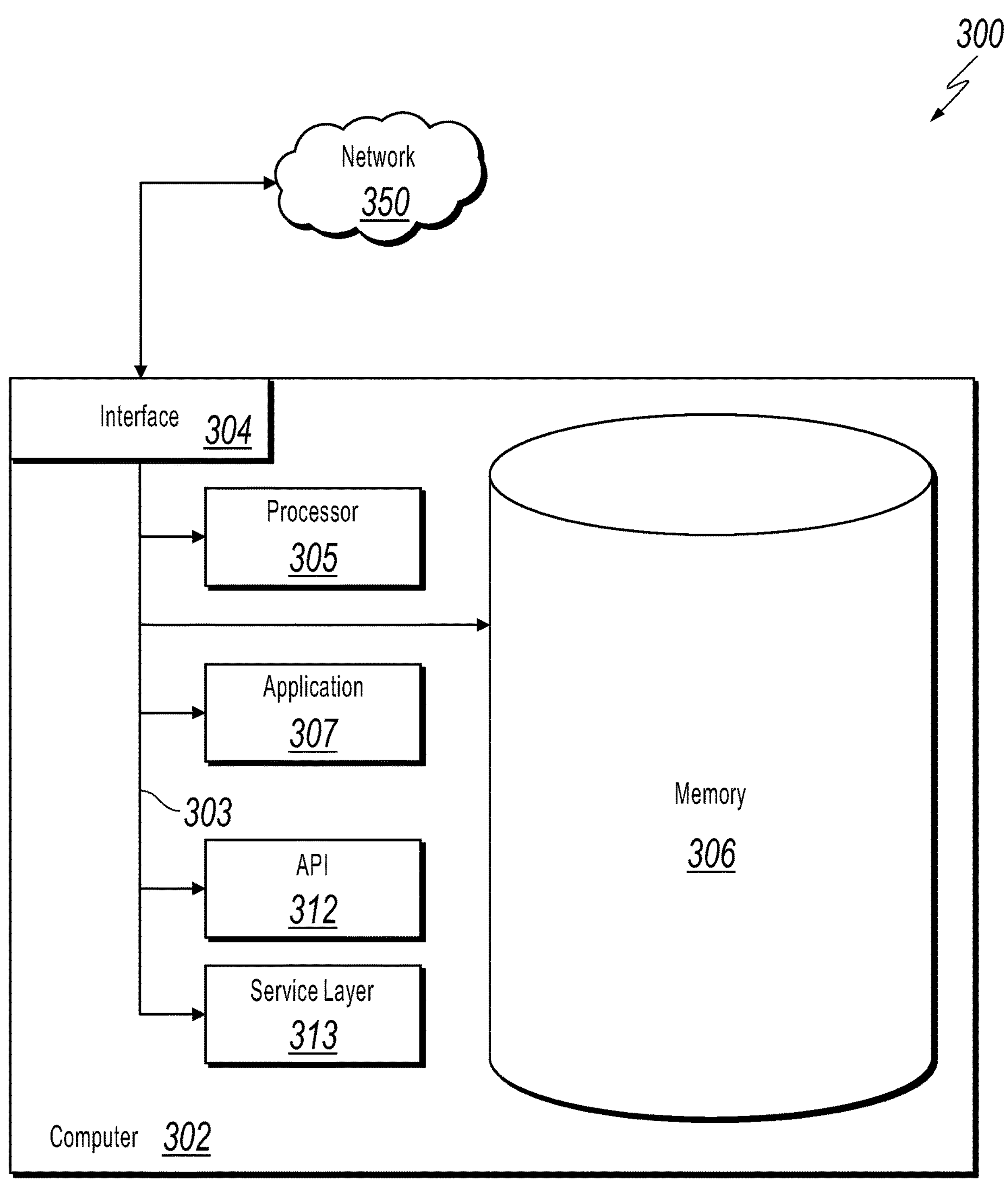
FIG. 3 illustrates a high-level architecture block diagram of a computer according to an implementation.

In some implementations, an automated algorithm can be used to verify label accuracy and select labeled data that have high likelihood for mislabels. A training dataset of labeled data is used to train multiple machine learning models. The labeled data in the training dataset may include mislabeled data. For each labeled data, a label uncertainty score can be determined based on the classification results produced by the multiple machine learning models. The label uncertainty score can be used to determine whether the labeled data may be mislabeled. Mislabeled data may be corrected through automatic label correction or submitted to a domain expert for further review. FIGS. 1-3 and associated descriptions provide additional details of these implementations.

Techniques described herein produce one or more technical effects. For example, this approach improves accuracy of labeled data that are used to train machine learning models and, therefore, improves the performance of machine learning operations.

FIG. 1 is a schematic diagram showing an example system 100 that performs a re-labeling determination operation, according to an implementation. At a high level, the example system 100 includes a server 120 that is communicatively coupled with a network 110.

The example system 100 includes the network 110. The network 110 represents an application, set of applications, software, software modules, hardware, or combination thereof, that can be configured to transmit data messages between the entities in the example system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs). A RAN is part of a wireless telecommunication system which implements a radio access technology, such as UMTS, CDMA2000, 3GPP LTE, 3GPP LTE-A, and 5G.

The server 120 includes a relabel analyzer 104. The relabel analyzer 104 represents an application, a set of applications, software, software modules, hardware, or any combination thereof, that are executed on the server 120 to determine whether to re-label labeled data. In one example operation, the relabel analyzer 104 obtains labeled data 140, and processes the labeled data 140 through a plurality of machine learning models, e.g., the machine learning models 122, 124, and 126. Each of the machine learning models generates a classification result of the labeled data 140 and sends the classification result to the label uncertainty calculation module 130. The label uncertainty calculation module 130 calculates a label uncertainty score based on the classification results. The label uncertainty calculation module 130 determines whether to re-label the labeled data 140 based on the label uncertainty score. FIG. 2 and associated descriptions provide additional details of these implementations.

The server 120 can be implemented using one or more computers, computer servers, or a cloud-computing platform.

In some cases, the server 120 can be a software service platform that detects whether a software code is malicious. In these cases, the labeled data can include feature vector of the software code and the label indicating whether the software code is benign or malicious.

The software code can be source code or binary code. In a software development process, source code can be created by programmers using a text editor or visual programming tool prior to compilation. The source code can be developed with a human-readable programming language and may be saved in a text file. The source code can be transformed by an assembler or a compiler into binary software code that can be executed by the computer.

The binary software code can include a stream of bytes that are generated by compiling the source code. Thus, the binary software code may not be in a human-readable format and may not be easily parsed or analyzed by a human.

The binary software code can be in a configuration of object code, executable code, or bytecode. An object code is the product of compiler output of a sequence of statements or instructions in a computer language. The source code can be logically divided into multiple source files. Each source file is compiled independently into a corresponding object file that includes object code. The object codes in the object files are binary machine codes, but they may not be ready to be executed. The object files can include incomplete references to subroutines outside themselves and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation or may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example process 200 of processing labeled data, according to an implementation. The illustrated process can be implemented as computer programs on one or more computers in one or more locations, in which the systems, components, and techniques described below can be implemented. The example process 200 can be implemented by one or more entities shown in FIG. 1, or any other systems or modules that process labeled data. For example, the process 200 can be implemented a server, e.g., the server 120 shown in FIG. 1. The example process 200 can also be implemented using additional, fewer, or different operations, which can be performed in the order shown or in a different order.

The example process 200 begins at 210, where a set of labeled data is obtained. Each data in the set includes a feature vector and a label. The feature vector indicates feature information of the data, and the label indicates a classification result of the data.

In one example, the labeled data can be used to develop a machine learning model that detects whether a software code may be potentially malicious. In some cases, the label can be binary, e.g., the label for each data may be set to "0"—indicating that the code is benign or may be set to "1"—indicating that the code may be potentially malicious. In some cases, the number of classes for the labels can be more than two. For example, the label can be set to 0, 1, 2, 3, indicating different degrees of risks for the code to be malicious.

For the software code detection example, the feature vector of the data may include information representing different features of the software code. Examples of the features include file size, file format, file type (e.g., binary or source code), associated operating system or programming environment, the number of particular strings included in the code, the structure of the code (e.g., the order of a set of instructions), signature, checksum, or other information of the software code that can be used to determine whether the software code is malicious. In some cases, the above-discussed feature information of a software code can be obtained from metadata associated with the code, from a preprocess operation that scans the software code and extracts the feature information automatically from the code, or both. The feature information can be coded into vectors and flattened into a single feature vector.

At 220, each labeled data is processed by a plurality of machine learning models to obtain a plurality of classification results. Each machine learning model has been trained to perform classification on the data.

In some cases, the plurality of machine learning models can have the same type but with different parameters. For example, each of the plurality of machine learning models can be a neural network, but they may have different number of layers, or neurons. In some cases, the plurality of machine learning models can have the same number of layers or neurons but are developed by using different sets of labeled data in the training process. In some cases, the plurality of machine learning models can include machine learning models of different types, e.g., support vector machines and neural network. Alternatively, or additionally, the plurality of machine learning models can include different types of neural networks, e.g., convolutional neural network (CNN), feedforward neural network (FNN), recurrent neural network (RNN), etc.

In some cases, the plurality of machine learning models can be generated by using virtual ensemble. The virtual ensemble can be formed based on one base machine learning model. Random parameters can be introduced to generate additional machine learning models from the machine learning model. In one example, the base machine learning model is a neural network that includes multiple layers, and each layer includes multiple neurons. For each neuron in the neural network, a random function can be used to determine whether to turn on or off the neuron. The random function can return one of two results, either "on" or "off", randomly. A default probability can be set. For example, if the default probability is set to 70%, the random function will return "on" with 70% probability and return "off" with 30% probability. During each operation, the random function for each neuron is executed. In the random function returns "on", the neuron is used to process the data. If the random function returns "off", the neuron is turned off and bypassed.

The virtual ensemble can include a plurality of such neural networks. These neural networks have the same structure, the same number of layers, the same number of neurons and the same parameters for each neuron. However, because of the random function, during each operation, different neurons will be turned on or off for each neural network, and thus these neural networks will effectively perform as different neural networks and may return different results. Using the virtual ensemble reduces the complexity to train and develop different machine learning models.

During operation, for each labeled data, each machine learning model processes the same feature vector of the labeled data to generate a classification result for the labeled data. Because these machine learning models are different, the classification results for the same labeled data may be different.

At 230, a label uncertainty score is determined for each labeled data based on the classification results obtained at 230 for the labeled data. The label uncertainty score is determined based on a difference between an average entropy score and an adjustment score.

The average entropy score can be calculated as follows:

In a classification operations, Equation 1 can be used to calculate the entropy of a model:

$$H_k(y \mid x, D) = -\sum_{\{c=1,\ldots,C\}} p_k(y=c \mid x, D) \log p_k(y=c \mid x, D) = -\sum_c p_k^c \log p_k^c, \tag{1}$$

where x represents the input feature vector, y represents the output class, and D represents the set of the data that has been used to train the respective model. C represents the total number of classes. K represents the number of models, k (k=1, . . . , K) represents each model in the K models. The prediction for model k is denoted as $$p_k^c = p_k(y=c|x, D).\ H_k(y|x, D)$$

represents the entropy for model k.

Equation 2 can be used to calculate the average entropy of the K models:

$$\text{av\_entropy} = \frac{1}{K}\sum_{\{k=1,\ldots K\}} H_k(y \mid x, D) \tag{2}$$

The adjustment score indicates the degree of deviations between the classification results produced by each model. In some cases, the degree of deviations can be indicated by using standard deviation calculation of the classification results of each model. A higher adjustment score reflects a higher degree of inconsistency among the models when classifying the same data. In some cases, a scaling factor can be applied to the adjustment score.

Equation 3 can be used to calculate the label uncertainty score:

$$\text{label uncertainty score} = \frac{1}{K}\sum_{\{k=1,\ldots,K\}} H_k(y \mid x, D) - s\sum_{\{c=1,\ldots,C\}} \text{std}_{\{k=1,\ldots,K\}}(p_k^c). \tag{3}$$

Where $\frac{1}{K}\sum_{\{k=1,\ldots,K\}} H_k(y \mid x, D)$ represents the average entropy determined at (2), std represents standard deviation function, $$\sum_{\{c=1,\ldots,C\}} std_{\{k=1,\ldots,K\}}(p_k^c)$$

represents the standard deviation of the classification results, and s represents the scaling factor. In some implementations, the scaling factor can be set to a value from 0.001 to 0.3.

In some cases, the scaling factor can be determined based on the problem context, the algorithm, and the data. The scaling factor is generally below 1. In one example, a trial range from 0.001 to 0.999 can be tested. A number of candidate values within the trial range can be selected by using on a log scale, e.g., 0.001, 0.005, 0.01, 0.05, 0.1, 0.5 etc. These candidate values can be used in experiments to evaluate the performance based on a performance metric. In some cases, the value of actual label error rate of the prioritized samples can be used as the performance metric. The higher the performance metric is, the more accurate that the formula with this specific scaling factor value is at selecting samples in terms of label noise.

A higher label uncertainty score indicates higher data uncertainty because it reflects higher consistency among the models, with each model exhibiting lower confidence.

At 240, the label uncertainty score is used to determine whether to re-label one or more labeled data in the set of labeled data. In some cases, for each labeled data, a label uncertainty score is calculated based on the classification results produced by the different models by using equations (1)-(3), as discussed previously. A threshold can be configured. If the label uncertainty score for one particular labeled data exceeds the threshold, the one particular labeled data may be determined as having higher data uncertainty. Alternatively, or additionally, the labeled data can be ranked based on their label uncertainty score. A configured percentage of the labeled data that have the highest label uncertainty scores, e.g., 1%, are determined to have higher data uncertainty and will be re-labeled.

In some implementations, a notification can be generated after the set of labeled data is processed. The notification can be outputted at a user interface of the server, sent to a different device, or a combination thereof. The notification can indicate the labeled data that have a label uncertainty score exceeding the configured threshold. The notification can further include the label uncertainty scores of these labeled data.

In some cases, these labeled data with higher data uncertainty are processed by a re-labeling operation to determine whether the label of the labeled data is correct. The re-labeling operation can include an automatic labeling operation to regenerate the label, submitting to domain expert for further review, or both. For the software code detection example, the re-labeling operation can include submitting the software code corresponding to the labeled data to a server for virus check, executing the software code in a controlled environment to determine whether it is malicious, or other measures.

While software code detection is used as an example to illustrate the operation of the label uncertainty determination of the labeled data, the process discussed in this disclosure can be used for other machine learning applications that use labeled data for classification, e.g., image recognition, voice or audio recognition, language translation or other applications.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the server 120 shown in FIG. 1. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or another suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or the interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a method, comprising: obtaining, by an electronic device, a set of labeled data, wherein each of the labeled data comprises a feature vector and a label; for each labeled data in the set of the labeled data: processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score; and determining, whether to re-label one or more labeled data in the set of labeled data based on the label uncertainty scores.

The foregoing and other described implementations can each, optionally, include one or more of the following features:

A first feature, combinable with any of the following features, wherein the adjustment score is determined based on a standard deviation of the classification results of the labeled data.

A second feature, combinable with any of the previous or following features, wherein the adjustment score is determined further based on a scaling factor.

A third feature, combinable with any of the previous or following features, wherein each of the labeled data represents a software code, and the label indicates whether the software code is potentially malicious.

A fourth feature, combinable with any of the previous or following features, wherein the plurality of machine learning models are part of a virtual ensemble.

A fifth feature, combinable with any of the previous or following features, wherein each neuron in the plurality of machine learning models is associated with a random function that returns an indicator to indicate whether the neuron is turned on or off.

A sixth feature, combinable with any of the previous features, wherein determining whether to re-label one or more labeled data comprises comparing the label uncertainty scores of the one or more labeled data with a configured threshold.

In a second implementation, a computer-readable medium containing instructions which, when executed, cause a computing device to perform operations comprising: obtaining a set of labeled data, wherein each of the labeled data comprises a feature vector and a label; for each labeled data in the set of the labeled data: processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score; and determining, whether to re-label one or more labeled data in the set of labeled data based on the label uncertainty scores.

The foregoing and other described implementations can each, optionally, include one or more of the following features:

A first feature, combinable with any of the following features, wherein the adjustment score is determined based on a standard deviation of the classification results of the labeled data.

A second feature, combinable with any of the previous or following features, wherein the adjustment score is determined further based on a scaling factor.

A third feature, combinable with any of the previous or following features, wherein each of the labeled data represents a software code, and the label indicates whether the software code is potentially malicious.

A fourth feature, combinable with any of the previous or following features, wherein the plurality of machine learning models are part of a virtual ensemble.

A fifth feature, combinable with any of the previous or following features, wherein each neuron in the plurality of machine learning models is associated with a random function that returns an indicator to indicate whether the neuron is turned on or off.

A sixth feature, combinable with any of the previous features, wherein determining whether to re-label one or more labeled data comprises comparing the label uncertainty scores of the one or more labeled data with a configured threshold.

In a third implementation, an electronic device, comprising: one or more computers; and one or more computer memory devices interoperably coupled with the one or more computers and having tangible, non-transitory, machine-readable media storing one or more instructions that, when executed by the one or more computers, perform one or more operations comprising: obtaining a set of labeled data, wherein each of the labeled data comprises a feature vector and a label; for each labeled data in the set of the labeled data: processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score; and determining, whether to re-label one or more labeled data in the set of labeled data based on the label uncertainty scores.

The foregoing and other described implementations can each, optionally, include one or more of the following features:

A first feature, combinable with any of the following features, wherein the adjustment score is determined based on a standard deviation of the classification results of the labeled data.

A second feature, combinable with any of the previous or following features, wherein the adjustment score is determined further based on a scaling factor.

A third feature, combinable with any of the previous or following features, wherein each of the labeled data represents a software code, and the label indicates whether the software code is potentially malicious.

A fourth feature, combinable with any of the previous or following features, wherein the plurality of machine learning models are part of a virtual ensemble.

A fifth feature, combinable with any of the previous or following features, wherein each neuron in the plurality of machine learning models is associated with a random function that returns an indicator to indicate whether the neuron is turned on or off.

A sixth feature, combinable with any of the previous features, wherein determining whether to re-label one or more labeled data comprises comparing the label uncertainty scores of the one or more labeled data with a configured threshold.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more Locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:

obtaining, by an electronic device, a set of labeled data, wherein each of the labeled data comprises a feature vector and a label;

for each labeled data in the set of the labeled data:

processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score that is determined based on the plurality of classification results that correspond to the plurality of machine learning models, wherein the adjustment score is determined based on a standard deviation of the classification results of the labeled data, wherein the average entropy score is determined based on the following equation:

$$\text{avg\_entropy} = \frac{1}{K}\sum_{\{k=1,\ldots K\}} H_k$$

wherein K represents a quantity of the plurality of machine learning models, K is an integer greater than 1, k (k=1, . . . , K) represents each model in the K machine learning models, k is an integer, $H_k$ represents an entropy of the k-th model in the K machine learning models;

determining whether to re-label one or more labeled data in the set of labeled data based on the label uncertainty scores; and re-labeling the one or more labeled data based on the determining.

2. The method of claim 1, wherein the adjustment score is determined further based on a scaling factor.

3. The method of claim 1, wherein each of the labeled data represents a software code, and the label indicates whether the software code is potentially malicious.

4. The method of claim 1, wherein the plurality of machine learning models are part of a virtual ensemble.

5. The method of claim 4, wherein each neuron in the plurality of machine learning models is associated with a random function that returns an indicator to indicate whether the neuron is turned on or off.

6. The method of claim 1, wherein determining whether to re-label one or more labeled data comprises comparing the label uncertainty scores of the one or more labeled data with a configured threshold.

7. A non-transitory computer-readable medium containing instructions which, when executed, cause a computing device to perform operations comprising:

obtaining a set of labeled data, wherein each of the labeled data comprises a feature vector and a label;

for each labeled data in the set of the labeled data:

processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score that is determined based on the plurality of classification results that correspond to the plurality of machine learning models, wherein the adjustment score is determined based on a standard deviation of the classification results of the labeled data, wherein the average entropy score is determined based on the following equation:

$$\text{avg\_entropy}=1/K\Sigma_{\{k=1,\ldots,K\}}H_k$$

wherein K represents a quantity of the plurality of machine learning models, K is an integer greater than 1, k (k=1, . . . , K) represents each model in the K machine learning models, k is an integer, $H_k$ represents an entropy of the k-th model in the K machine learning models;

determining whether to re-label one or more labeled data in the set of labeled data based on the label uncertainty scores; and re-labeling the one or more labeled data based on the determining.

8. The computer-readable medium of claim 7, wherein the adjustment score is determined further based on a scaling factor.

9. The computer-readable medium of claim 7, wherein each of the labeled data represents a software code, and the label indicates whether the software code is potentially malicious.

10. The computer-readable medium of claim 7, wherein the plurality of machine learning models are part of a virtual ensemble.

11. The computer-readable medium of claim 10, wherein each neuron in the plurality of machine learning models is associated with a random function that returns an indicator to indicate whether the neuron is turned on or off.

12. The computer-readable medium of claim 7, wherein determining whether to re-label one or more labeled data comprises comparing the label uncertainty scores of the one or more labeled data with a configured threshold.

13. An electronic device, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a set of labeled data, wherein each of the labeled data comprises a feature vector and a label;

for each labeled data in the set of the labeled data:

processing the labeled data to obtain a plurality of classification results by using a plurality of machine learning models, wherein each of the plurality of classification results is obtained by using a different machine learning model in the plurality of machine learning models to process the feature vector of the labeled data; and determining a label uncertainty score of the labeled data based on a difference between an average entropy score and an adjustment score that is determined based on the plurality of classification results that correspond to the plurality of machine learning models, wherein the adjustment score is determined based on a standard deviation of the classification results of the labeled data, wherein the average entropy score is determined based on the following equation:

$$avg\_entropy=1/K\Sigma_{\{k=1, \ldots, K\}}H_k$$

wherein K represents a quantity of the plurality of machine learning models, K is an integer greater than 1, k (k=1, . . . , K) represents each model in the K machine learning models, k is an integer, $H_k$ represents an entropy of the k-th model in the K machine learning models;

determining whether to re-label one or more labeled data in the set of labeled data based on the label uncertainty scores; and re-labeling the one or more labeled data based on the determining.

14. The electronic device of claim 13, wherein the adjustment score is determined further based on a scaling factor.

15. The electronic device of claim 13, wherein each of the labeled data represents a software code, and the label indicates whether the software code is potentially malicious.

16. The electronic device of claim 13, wherein the plurality of machine learning models are part of a virtual ensemble.

17. The electronic device of claim 16, wherein each neuron in the plurality of machine learning models is associated with a random function that returns an indicator to indicate whether the neuron is turned on or off.

* * * * *